United States Patent

Shinoda et al.

(10) Patent No.: US 8,757,214 B2
(45) Date of Patent: Jun. 24, 2014

(54) MULTI-LAYER HOSE

(75) Inventors: Atsuhiro Shinoda, Isehara (JP); Hiroshi Kumagai, Yamato (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 532 days.

(21) Appl. No.: 12/469,241

(22) Filed: May 20, 2009

(65) Prior Publication Data

US 2009/0288729 A1 Nov. 26, 2009

(30) Foreign Application Priority Data

May 21, 2008 (JP) .................................. 2008-133021
Apr. 16, 2009 (JP) .................................. 2009-099767

(51) Int. Cl.
*F16L 11/00* (2006.01)

(52) U.S. Cl.
USPC .......................... 138/137; 138/141; 428/36.91

(58) Field of Classification Search
USPC ................... 138/137, 141; 428/36.91
See application file for complete search history.

(56) References Cited

U.S. PATENT DOCUMENTS

| | | | | |
|---|---|---|---|---|
| 4,762,589 A | * | 8/1988 | Akiyama et al. | 156/307.3 |
| 4,905,734 A | * | 3/1990 | Ito | 138/126 |
| 4,905,735 A | | 3/1990 | Akiyoshi | |
| 4,907,625 A | * | 3/1990 | Ito et al. | 138/126 |
| 5,084,314 A | * | 1/1992 | Igarashi et al. | 428/36.2 |
| 5,093,166 A | * | 3/1992 | Nishimura | 428/36.2 |
| 5,937,911 A | * | 8/1999 | Kodama et al. | 138/137 |
| 6,923,218 B2 | * | 8/2005 | Kumagai et al. | 138/109 |
| 6,989,198 B2 | * | 1/2006 | Masuda et al. | 428/474.9 |
| 8,491,978 B2 | * | 7/2013 | Shinoda et al. | 428/35.7 |
| 2003/0113464 A1 | | 6/2003 | Fukushi et al. | |
| 2009/0000685 A1 | * | 1/2009 | Shinoda et al. | 138/137 |
| 2010/0300571 A1 | * | 12/2010 | Miller et al. | 138/137 |

FOREIGN PATENT DOCUMENTS

| | | |
|---|---|---|
| EP | 1 236 944 A1 | 9/2002 |
| JP | 59-013419 | 4/1984 |
| JP | 02-038791 | 2/1990 |
| JP | 02-038792 | 2/1990 |
| JP | 2003-159714 | 6/2003 |
| JP | 2004-506548 A | 3/2004 |

OTHER PUBLICATIONS

Office Action mailed Aug. 8, 2012 in corresponding Japanese patent application No. 2009-099767.

* cited by examiner

*Primary Examiner* — James Hook
(74) *Attorney, Agent, or Firm* — Foley & Lardner LLP

(57) ABSTRACT

A multi-layer hose (10) of a laminated layer structure having laminated an intermediate layer (12) including a resin containing a polyester or a polyamide, an inner layer (11) disposed on an inner periphery of the intermediate layer (12), and an outer layer (13) disposed on an outer periphery of the intermediate layer (12) and containing a rubber, the inner layer (11) containing epichlorohydrin rubber or hydrin rubber and directly laminated to the intermediate layer (12) by a vulcanized adhesion.

5 Claims, 2 Drawing Sheets

| EXAMPLE NOS. | | HOSE MATERIALS BY LAYERS | | | | HOSE PERFORMANCES | | | |
|---|---|---|---|---|---|---|---|---|---|
| | | INNER LAYER | INTERMEDIATE LAYER | INTERVENING LAYER | OUTER LAYER | FUEL PERMEABILITY | ADHESIVITY | FUEL EXTRACTIVITY | OVERALL EVALUATION |
| EMB. | 1 | ECO | PBN | — | ECO | ◎ | ◎ | ○ | ◎ |
| | 2 | ECO | PBT | — | ECO | ◎ | ◎ | ○ | ◎ |
| | 3 | ECO | PA9T | — | ECO | ◎ | ◎ | ○ | ◎ |
| | 4 | CO | PBN | — | ECO | ◎ | ◎ | ○ | ◎ |
| | 5 | CO | PBT | — | ECO | ◎ | ◎ | ○ | ◎ |
| | 6 | CO | PA9T | — | ECO | ◎ | ◎ | ○ | ◎ |
| | 7 | ECO | PBT | — | EPDM | ◎ | ◎ | ○ | ◎ |
| | 8 | ECO | PBN | — | EPDM | ◎ | ◎ | ○ | ◎ |
| | 9 | ECO | PA9T | — | EPDM | ◎ | ◎ | ○ | ◎ |
| | 10 | ECO | PBT | — | AEM | ◎ | ◎ | ○ | ◎ |
| | 11 | ECO | PBT | — | NBR | ◎ | ◎ | ○ | ◎ |
| | 12 | ECO | PBT | — | CSM | ◎ | ◎ | ○ | ◎ |
| | 13 | ECO | PBT | — | CO | ◎ | ◎ | ○ | ◎ |
| COMP. | 1 | NBR | THV | — | NBR | ○ | ○ | ○ | ○ |
| COMP. | 2 | NBR | THV | NBR | CSM | ○ | ○ | △ | △ |
| COMP. | 3 | ECO | PPS | — | ECO | ◎ | △ | △ | △ |
| COMP. | 4 | NBR | PBT | — | CSM | ◎ | △ | △ | △ |

MULTI-LAYER HOSE

BACKGROUND OF THE INVENTION

1. Field of the Invention

The present invention relates to a multi-layer hose suitable as a fuel hose for vehicles, and particularly, to a multi-layer hose excellent in anti-fuel-permeability to alcohol blended fuels and excellent in interlayer adhesion property.

2. Description of the Related Art

In recent years, regulations to hydrocarbon transpiration gases from vehicular fuels have been highly tightened, particularly in and around the U.S.A. Addressing such regulation, there are advancing developments of rubber hoses for fuels.

In particular, there are proposals of multi-layer hoses including an intermediate layer having a resin material provided as a fuel-proof barrier, and inner and outer layers having rubber materials laminated on both sides of the intermediate layer, to have a secured connection-pipe sealing property, anti-fuel-permeability, flexibility, etc.

There is a multi-layer hose proposed in Japanese National-Phase Patent Application Laid-Open Publication No. 2004-506548, which has a fluorine-contained rubber (FKM) or acrylonitrilebutadiene rubber (NBR) disposed as an inner layer, a ternary copolymer THV (tetrachloroethylene-hexafluoropropylene-vinylidenefluoride) with a fuel barrier function disposed as an intermediate layer, and epichlorohydrin rubber (ECO) or nitrile rubber (acrylonitrilebutadiene rubber, NBR) disposed as an outer layer. Further, there is a proposal of a multi-layer hose having a layer of chlorosulfonated polyethylene rubber (CSM) or chrolinated polyethylene rubber (CPE) laminated on an outer layer.

SUMMARY OF THE INVENTION

For multi-layer hoses having a fluorine-contained resin as a fuel barrier layer, there is a trend toward a thickened fuel barrier layer to have a secured fuel barrier property to the ethanol blended gasoline that has expanding applications addressing environment. However, thickened fuel barrier layers degrade hose's flexibility and workability. The thicker the fuel barrier layer is, the wider the incompatibility becomes between fuel barrier property and secured workability of multi-layer hose.

Further, for the adhesiveness to be secured between fluorine-contained resin and rubber layer, it becomes necessary to provide an adhesive agent layer, make a primer process, and blend an adhesiveness activator to the rubber layer. An adhesive agent in use may have unreacted adhesive components extracted in fuel, with an anxiety about influences on peripheral component parts.

The present invention has been devised in view of such issues in conventional multi-layer hoses using a fluorine-contained resin as a fuel barrier layer. It therefore is an object of the present invention to provide a multi-layer hose with a preferable fuel barrier property relative even to now fuel-proof barrier techniques, an enhanced adhesiveness to rubber layer, and an excellent fuel barrier property to alcohol blended fuels.

To achieve the object described, according to a first aspect of the present invention, a multi-layer hose comprises a laminated layer structure having laminated an intermediate layer including a resin containing a polyester or a polyamide, an inner layer disposed on an inner periphery of the intermediate layer, and an outer layer disposed on an outer periphery of the intermediate layer and containing a rubber, the inner layer containing epichlorohydrin rubber or hydrin rubber and directly laminated to the intermediate layer by a vulcanized adhesion.

BRIEF DESCRIPTION OF THE DRAWINGS

FIG. 3 is a table listing results of performance evaluation tests on multi-layer hoses according to embodiment examples and comparative examples.

DETAILED DESCRIPTION OF THE PREFERRED EMBODIMENTS

There will be described the preferred embodiments of the present invention, with reference to the accompanying drawings. It is noted that % means a percentage by weight, unless otherwise specified.

Figure 1:
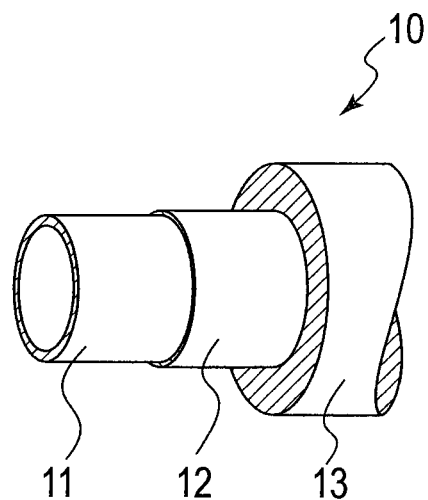
FIG. 1 is a perspective view of a multi-layer hose according to an embodiment of the present invention.

FIG. 1 illustrates a multi-layer hose 10 according to an embodiment of the present invention, which is adaptive as a fuel vapor piping hose for vehicles using an alcohol blended fuel, for instance. The multi-layer hose 10 is configured with a laminated layer structure that has laminated an intermediate layer 12 including a resin containing a polyester or a polyamide, an inner layer 11 disposed on an inner periphery of the intermediate layer 12, and an outer layer 13 disposed on an outer periphery of the intermediate layer 12 and containing a rubber. The inner layer 11 contains epichlorohydrin rubber (ECO) or hydrin rubber (CO). The inner layer 11 is directly laminated to the intermediate layer 12 by a vulcanized adhesion. The inner layer 11 is an innermost layer of the laminated layer structure constituting the multi-layer hose 10, and serves as a contact layer contacting on a fluid to be transferred through the multi-layer hose 10.

The multi-layer hose 10 has as the intermediate layer 12 a resin containing polyester or polyamide, which is excellent in barrier property to alcohol blended fuels and in adhesive property to rubbers, and can be thinner in wall thickness than conventional hoses using a thick fluorine-contained rein, while affording to have an equivalent barrier property to such conventional hoses. The possible thin dimension of multi-layer hose allows for a secured flexibility and workability.

For the barrier property to be secured, the intermediate layer 12 may preferably contain 70% or more of polyester or polyamide. The polyester to be used may be a resin being polybutylene naphthalate (PBN) or a copolymer of PBN, polybutylene terephthalate (PBT) or a copolymer of PBT, or a blend of PBN and PBT. The polyamide (PA) may be a resin being PA 9T, PA 6T, PA 6, PA 66, PA 610, PA 612, or PA 46, or a copolymer of an arbitrary one of them, or an arbitrary mixture of them. The arbitrary copolymer encompasses not simply a binary copolymer, but also a ternary copolymer. Polymeric ratio of the copolymer as well as mixing ratio of the mixture is not specifically restricted.

In the multi-layer hose 10, the inner layer 11 and the intermediate layer 12 are directly laminated to each other. In other words, the inner layer 11 and the intermediate layer 12 are directly contacted to adhere to each other for lamination in between, without intervenient layers of different components such as an adhesive layer. More specifically, the intermediate layer 12 that is a resin containing polyester or polyamide and the inner layer 11 that contains ECO or CO are directly laminated on each other, and additionally the inner layer 11 is vulcanized, to thereby make the inner layer 11's rubber crosslink, concurrently causing the inner layer 11 and thus neighboring intermediate layer 12 to be adhered by vulcanization to each other. Like this, a strong interlayer adhesion can be secured, without conventional steps such as mixing an adhesive component to a rubber layer of an inner layer, or applying an adhesive agent to a surface of a resin layer of an intermediate layer. The strong interlayer adhesion permits the multi-layer hose 10 to have an excellent fuel barrier property such as an anti-fuel-permeability to be secured against alcohol blended fuels.

The multi-layer hose 10 can do without using an adhesive agent or such, allowing for a suppressed extraction of adhesive components to fuels. Further, it can do without having between intermediate and inner layers an intervenient different layer containing an adhesive component, thus permitting the wall thickness of multi-layer hose to be entirely reduced, allowing for provision of a multi-layer hose excellent in workability. With a secured strong interlayer adhesion, the multi-layer hose 10 can exhibit an excellent fuel barrier property and low-temperature impact resistance even under low temperatures within a range of −30 to 40 degrees centigrade.

The multi-layer hose 10 allows for a suppressed extraction of adhesive components to fuels, as described. Employable as an index of extraction is a total quantity of respective components of phenol compound, epoxy compound, acrylic compound, isocyanate compound, silane coupling agent, and osmium compound in hexane insoluble matters of an extract obtained from a liquid as a mixture of isooctane, toluene, and ethanol mixed by ratios of 45:45:10 by volume, as sealed inside the inner layer 11 and left for 168 hours (one week) at a temperature of 40 degrees centigrade, which should be within a range of 0.5 mg/cm$^2$ or less in a reduced mass per area of an inside surface of the inner layer 11. Those compounds described as contained in hexane insoluble matters of the extract are probable ones that may be contained as adhesive components for adhesion between the inner layer 11 and the intermediate layer 12. If the total quantity of them exceeds 0.5 mg/cm$^2$ in terms of a reduced mass per unit area in contact with the sealed liquid, peripheral component parts may be deteriorated or their performances may be influenced. The multi-layer hose 10 includes no adhesive components for adhesion between the inner layer 11 and the intermediate layer 12, so the total quantity of the above compounds falls within the range of 0.5 mg/cm$^2$ or less in reduced mass per area of the inside surface of the inner layer 11.

The outer layer 13 as an outermost layer disposed on an outer periphery of the intermediate layer 12 may have ECO, CO, NBR, acrylic rubber (ACM), ethylene-acrylic rubber (AEM), CSM, CPE, chroloprene rubber (CR), ethylene-propylene rubber (EPM), or ethylene-propylene-diene rubber (EPDM) employed as a rubber material therefor. In particular, ECO or CO is preferable as a rubber material to be employed for the outer layer 13. For ECO or CO employed as a rubber material for outer layer 13, the outer layer 13 and the intermediate layer 12 may preferably be directly laminated to vulcanize. This permits a strong interlayer adhesion to be secured, without using specific adhesive components. In this case, there is given an excellent fuel barrier property not simply in conduction of an alcohol blended fuel in contact with the inner layer 11, but also in conduction of an alcohol blended fuel in contact with the outer layer 13, and even in conduction of an alcohol blended fuel in contact with both the inner layer 11 and the outer layer 13.

The multi-layer hose 10 has as its basic structure the three-layered structure composed of the intermediate structure 12, and the inner layer 11 and the outer layer 13 disposed inside and outside thereof, while the number of layers is not restrictive, so long as the intermediate layer 12 and the inner layer 11 are directly laminated on each other by a vulcanized adhesion. In other words, the multi-layer hose 10 may well have additional layers such as a cover layer put inside the inner layer 11 or outside the outer layer 13, as necessary for a variety of required performances. The inner layer 11, intermediate layer 12, and outer layer 13 may well be multi-layered, alone or in combination. There may well be an intervenient layer between the intermediate layer 12 and the outer layer 13.

The multi-layer hose 10 is characteristic particularly in combination of compositions of inner layer 11 and intermediate layer 12, and the fabrication method is not restricted. For instance, the multi-layer hose 10 may be made by fabrication of a tubular hose of multi-layer structure by a method of tandem extrusion technique by multi-layer extrusion of respective layers, or a method of winding a resin to be positioned as an intermediate layer on an inner layer composed of a tubular rubber, as it is followed by a vulcanizing. Vulcanizing temperatures may preferably controlled within a range of 150 to 165 degrees centigrade, more preferably within a range of 155 to 165 degrees centigrade. The vulcanizing time may preferably be within a range of 60 to 90 minutes. In some cases, a primary vulcanizing may well be followed by a secondary vulcanizing.

The multi-layer hose 10 has a configuration that includes as an intermediate layer 12 a resin containing a polyester or a polyamide with an excellent barrier property to alcohol blended fuels, and an inner layer 11 containing ECO or CO and disposed inside the intermediate layer 12, and is suitable as a fuel hose for vehicles using an alcohol blended fuel, or as a vapor piping hose for vehicular fuel systems. The multi-layer hose 10 has a variety of applications else than as a hose, as well, covering among others a wide range of applications such as to a container for alcohol-containing liquids, a supply pipe, and a storage tank.

There will be described specific examples of embodiment of the present invention, while they are not restrictive in any way.

Embodiment Example 1

For fabrication of a multi-layer hose 10 of a three-layer structure illustrated in FIG. 1, employed in this example were ECO as an inner layer 11, PBN (Teijin Kasei made TQB-OT) as an intermediate layer 12, and ECO as an outer layer 13. The inner layer 11, intermediate layer 12, and outer layer 13 were extruded under conditions including a cylinder temperature of 80 degrees centigrade and a dice temperature of 90 degrees centigrade, thereby obtaining a tubular hose, which underwent a primary vulcanizing for 30 minutes at 150 degrees centigrade, and a secondary vulcanizing for 90 minutes at 150 degrees centigrade.

For embodiment example 1, obtained multi-layer hoses had an inner layer 0.5 mm thick, an intermediate layer 0.1 mm thick, and an outer layer 2.4 mm thick, with a hose outside diameter of 12.0 mm, a hose inside diameter of 6.0 mm, and a hose length of 300 mm.

Embodiment Example 2

For this example, employed was a three-layer structure identical to the embodiment example 1, except for an intermediate layer made of PBT (Polyplastic made 700FP).

Embodiment Example 3

For this example, employed was a three-layer structure identical to the embodiment example 1, except for an intermediate layer made of PA (polyamide) 9T (Kurarer made).

Embodiment Example 4

For this example, employed was a three-layer structure identical to the embodiment example 1, except for an inner layer made of CO.

Embodiment Example 5

For this example, employed was a three-layer structure identical to the embodiment example 2, except for an inner layer made of CO.

Embodiment Example 6

For this example, employed was a three-layer structure identical to the embodiment example 3, except for an inner layer made of CO.

Embodiment Example 7

For this example, employed was a three-layer structure identical to the embodiment example 2, except for an outer layer made of EPDM.

Embodiment Example 8

For this example, employed was a three-layer structure identical to the embodiment example 1, except for an outer layer made of EPDM.

Embodiment Example 9

For this example, employed was a three-layer structure identical to the embodiment example 3, except for an outer layer made of EPDM.

Embodiment Example 10

For this example, employed was a three-layer structure identical to the embodiment example 2, except for an outer layer made of AEM.

Embodiment Example 11

For this example, employed was a three-layer structure identical to the embodiment example 2, except for an outer layer made of NBR.

Embodiment Example 12

For this example, employed was a three-layer structure identical to the embodiment example 2, except for an outer layer made of CSM.

Embodiment Example 13

For this example, employed was a three-layer structure identical to the embodiment example 2, except for an outer layer made of CO.

Comparative Example 1

For this example, employed was a three-layer structure identical to the embodiment example 1, except for an intermediate layer made of ternary copolymer fluorine-contained resin THV, and inner and outer layers made of NBR (as a vulcanized system: sulfur vulcanized) with admixed 1,5-diazabicyclo[4,3,0]-5-nonene.

Comparative Example 2

Figure 2:
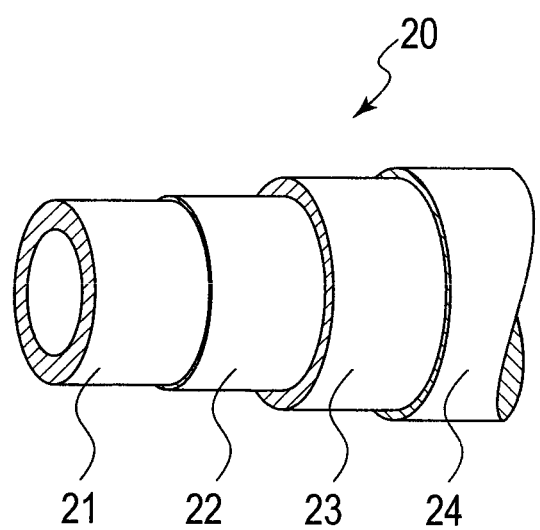
FIG. 2 is a perspective view of a multi-layer hose according to a comparative example 2.

For this example, employed was a multi-layer hose 20 illustrated in FIG. 2, which had a four-layer structure including an inner layer 21 made of NBR (as a vulcanized system: sulfur vulcanized) with admixed 1,5-diazabicyclo[4,3,0]-5-nonene, an intermediate layer 22 made of ternary copolymer fluorine-contained resin THV, an outer layer 24 made of CSM, and an intervenient layer 23 intervening between the intermediate layer 22 and the outer layer 24, the intervenient layer 23 being made of NBR (as a vulcanized system: sulfur vulcanized) with admixed 1,5-diazabicyclo[4,3,0]-5-nonene, like the inner layer 21, and which was fabricated by an identical method to the comparative example 1.

For comparative example 2, obtained multi-layer hoses had an inner layer 1.5 mm thick, an intermediate layer 0.1 mm thick, an intervenient layer 0.9 mm thick, and an outer layer 0.5 mm thick, with a hose outside diameter of 12.0 mm, a hose inside diameter of 6.0 mm, and a hose length of 300 mm.

Comparative Example 3

For this example, employed was a three-layer structure identical to the embodiment example 1, except for an intermediate layer made of PPS (polyphenylsulfide).

Comparative Example 4

For this example, employed was a three-layer structure identical to the embodiment example 12, except for an inner layer made of NBR (as a vulcanized system: sulfur vulcanized) similar to that of the embodiment example 2.

For each of the foregoing embodiment examples and comparative examples, a fuel permeability test, an adhesion test, and a fuel extraction test of multi-layer hose were performed, and performances of hose were evaluated, of which results are listed in FIG. 3.

[Fuel Permeability Test]

A mixed fuel of commercially available regular gasoline (90 vol %) and ethanol (10 vol %) was poured in a stainless steel test container, where a sample of multi-layer hose of a respective embodiment or comparative example was fixed at one end thereof by a clamp, while the other end was fixed by a clamp to a stainless steel sealing plug. Under this condition, the sample was left in an atmosphere of 40 degrees centigrade for 20 weeks, and thereafter, a fuel permeation rate was measured, using SHED (Sealed Housing For Evaporative Determination) under specified conditions of CARB (California Air Resources Board).

In FIG. 3, "double circle (◎)" denotes a permeation rate smaller than one tenth of that of a multi-layer hose of the comparative example 1, and "single circle (○)" denotes an equivalent permeation rate.

[Adhesion Test]

A mixed fuel of commercially available regular gasoline (90 vol %) and ethanol (10 vol %) was sealed in a sample of multi-layer hose of a respective embodiment or comparative example, which was left at 60 degrees centigrade for 168 hours, and after removal of sealed liquid, it was left at a room temperature for 10 minutes. Then, from the hose, test pieces were punched out with a size of 10-mm width by 200-mm length, with a thickness of the hose itself.

At an arbitrary location of a punched test piece, part of intermediate layer and part of inner rubber layer (as inner layer) were peeled to some extent and caught by a grip of a tester. The tester was operated under prescribed conditions in JIS K6256, describing a tensile load curve on a graph, of which an average value of wavy section was determined as an exfoliation load, and an exfoliation strength was calculated, such that:

In FIG. 3, "double circle (◎)" denotes an exfoliation strength greater than that of a multi-layer hose of the comparative example 1, and "single circle (○)" denotes an equivalent strength, and "triangle (Δ)" denotes a smaller strength.

[Fuel Extraction Test]

A mixed fuel of isooctane (45 vol %), toluene (45 vol %), and ethanol (10 vol %) commercially available regular gasoline (90 vol %) and ethanol (10 vol %) was sealed in a sample of multi-layer hose of a respective embodiment or comparative example, which was left at 40 degrees centigrade for 168 hours, and thereafter, sealed liquid was taken out as an extract. The extract was exposed to air blows to dry and concentrate, and a concentrated liquid was admixed with hexane, which was stirred for one hour or more by an ultrasonic cleaner.

Next, the extract was left for 24 hours, and supernatant solution was removed, then precipitates were vacuum-dried at 40 degrees centigrade for 8 hours, and thus obtained insoluble substances were taken as hexane insoluble matters.

The hexane insoluble matters were analyzed for phenol compound, epoxy compound, acrylic compound, isocyanate compound, silane coupling agent, and osmium compound therein, by use of analyzers such as a gas chromatograph mass spectrometer (GC-MS) and an infrared spectroscopy (IR), and a total quantity of the above components was calculated in terms of a reduced mass (mg/cm$^2$) per area of an inside surface of multi-layer hose. In FIG. 3, "single circle (○)" denotes a total quantity within a range of 0.5 mg/cm$^2$ or less, and "triangle (Δ)" denotes a total quantity exceeding 0.5 mg/cm$^2$.

[Results]

As shown in FIG. 3, it was verified that multi-layer hoses in the embodiment examples 1 to 13 were all superior in property in concern to any multi-layer hose in the comparative examples. It was verified that multi-layer hoses in the embodiment examples 1 to 13 had a sufficient interlayer adhesion property between an inner layer as a rubber and an intermediate layer as a fuel barrier layer, to be excellent in adhesion property. Further, due to a vulcanized adhesion of inner layer and intermediate layer, the layers were free of adhesive components, and in any fuel extraction test, the extract quantity was little, giving a good result. It was verified in the fuel permeation test that using as an intermediate layer a resin containing polyester or polyamide as a main component provides an excellent anti-fuel-permeation property (a fuel barrier property) against an ethanol blended gasoline. Further, it was verified that multi-layer hoses in the embodiment examples 1-13 were in excellent in low-temperature impact resistance, as well.

The entire content of Japanese Patent Application No. P2008-133021 filed May 21, 2008 and Japanese Patent Application No. P2009-099767 filed Apr. 16, 2009 are incorporated herein by reference.

Although embodiments of the invention have been described, the invention is not limited to those embodiments, and modifications may become apparent to those skilled in the art in light of the teachings herein, and the scope of invention should be defined by appended claims.

What is claimed is:

1. A three-layer hose comprising:
   a laminated three-layer structure consisting of:
      an intermediate layer including a resin containing a polyester or a polyamide;
      an inner layer disposed on an inner periphery of the intermediate layer and consisting of epichlorohydrin rubber or hydrin rubber; and
      an outer layer disposed on an outer periphery of the intermediate layer and containing a rubber,
   wherein the rubber of the inner layer is in direct contact with the resin of the intermediate layer, with no intervening layer disposed therebetween,
   wherein the rubber of the inner layer is directly laminated to the resin of the intermediate layer by vulcanized adhesion, and
   wherein the laminated layer structure consisting of the intermediate layer, inner layer, and outer layer is formed using multi-layer extrusion such that each of the intermediate layer, the inner layer, and the outer layer has a continuous cylindrical cross-section.

2. The multi-layer hose according to claim 1, wherein the polyester is at least one resin being selected from the group consisting of polybutylene naphthalate, a copolymer of polybutylene naphthalate, polybutylene terephthalate, or a copolymer of polybutylene terephthalate, and the polyamide is at least one resin being selected from the group consisting of polyamide 9T, polyamide 6T, polyamide 6, polyamide 66, polyamide 610, polyamide 612, or polyamide 46, or a copolymer thereof.

3. The multi-layer hose according to claim 1, wherein the multi-layer hose is manufactured by the steps of:
   laminating directly the intermediate layer and the inner layer;
   vulcanizing the inner layer to make cross-linked rubber; and
   adhering the inner layer and intermediate layer by vulcanization.

4. The multi-layer hose according to claim 1, wherein the rubber of the outer layer is at least one rubber being selected from the group consisting of epichlorohydrin rubber, hydrin rubber, acrylonitrilebutadiene rubber, acrylic rubber, ethylene-acrylic rubber, chlorosulfonated polyethylene rubber, chlorinated polyethylene rubber, chloroprene rubber, ethylene-propylene rubber, or ethylene-propylene-diene rubber.

5. The multi-layer hose according to claim 1, wherein the rubber of the outer layer comprises epichlorohydrin rubber or hydrin rubber, and is directly laminated to the polyester-based or polyamide-based resin of the intermediate layer by vulcanized adhesion.

* * * * *